(12) United States Patent
Princivalle et al.

(10) Patent No.: US 8,968,667 B2
(45) Date of Patent: Mar. 3, 2015

(54) ELECTROCHEMICAL CATALYSIS SYSTEM

(75) Inventors: Agnes Princivalle, Lagnes (FR); Philippe Vernoux, Rochetaillee sur Saone (FR); Abdelkader Hadjar, Saint-Etienne (FR); Christian Guizard, Cournonterral (FR)

(73) Assignees: Saint-Gobain Centre de Recherches et d'Etudes Europeen, Courbevoie (FR); Centre National de la Recherche Scientifique, Paris (FR); Universite Claude Bernard-Lyon 1, Villeurbanne (FR)

( * ) Notice: Subject to any disclaimer, the term of this patent is extended or adjusted under 35 U.S.C. 154(b) by 274 days.

(21) Appl. No.: 13/700,528

(22) PCT Filed: Jun. 16, 2011

(86) PCT No.: PCT/FR2011/051380
§ 371 (c)(1),
(2), (4) Date: Feb. 19, 2013

(87) PCT Pub. No.: WO2011/157963
PCT Pub. Date: Dec. 22, 2011

(65) Prior Publication Data
US 2013/0142702 A1 Jun. 6, 2013

(30) Foreign Application Priority Data
Jun. 16, 2010 (FR) .................................... 10 54778

(51) Int. Cl.
*B01D 50/00* (2006.01)

(52) U.S. Cl.
USPC ......................................... 422/177; 422/171

(58) Field of Classification Search
USPC .............. 422/171, 177, 180; 423/246; 502/66
See application file for complete search history.

(56) References Cited

U.S. PATENT DOCUMENTS

| | | | |
|---|---|---|---|
| 5,075,276 A | 12/1991 | Ozawa et al. | |
| 5,500,198 A | 3/1996 | Liu et al. | |
| 6,831,036 B1 * | 12/2004 | Yamazaki et al. | 502/327 |
| 6,878,354 B1 * | 4/2005 | Katashiba et al. | 422/211 |
| 8,211,824 B2 * | 7/2012 | Akamine et al. | 502/332 |
| 2003/0027027 A1 | 2/2003 | Cutler et al. | |
| 2004/0018939 A1 * | 1/2004 | Chigapov et al. | 502/303 |
| 2009/0163354 A1 | 6/2009 | Andy et al. | |
| 2010/0105547 A1 | 4/2010 | Ito et al. | |
| 2010/0287916 A1 | 11/2010 | Vernoux et al. | |

FOREIGN PATENT DOCUMENTS

| | | |
|---|---|---|
| DE | 39 13 972 A1 | 11/1989 |
| EP | 1 254 862 A2 | 11/2002 |
| EP | 2 135 672 A1 | 12/2009 |
| FR | 2 899 493 A1 | 10/2007 |
| FR | 2 921 847 A1 | 4/2009 |
| JP | 2001-58130 A | 3/2001 |
| JP | 2002-210365 A | 7/2002 |
| JP | 2004-66173 A | 3/2004 |
| JP | 2005-254217 A | 9/2005 |

OTHER PUBLICATIONS

International Search Report issued Feb. 24, 2012 in PCT/FR2011/051380.

Dagmar Bleilebens, et al., "Struktur and Leitfähigkeit dünner Cer-Gadoliniumoxid-Schichten", Berichte des Forschungszentrums Jülich, XP002659869, vol. 3961, Feb. 1, 2002, pp. 7-15 with cover pages.

Hidenori Yahiro, et al., "Oxygen ion Conductivity of the Ceria-Samarium Oxide System with Fluorite Structure", Journal of Applied Electrochemistry, XP002659813, vol. 18, No. 4, Jul. 1, 1988, pp. 527-531.

Cesare Oliva, et al., "EPR Characterisation of $(CeO_2)_{1-y}(La_2CuO_4)_y$ oxide mixtures and their catalytic activity for NO reduction by CO", Journal of the Chemical Society, XP000731779, vol. 94, No. 4, Feb. 21, 1998, pp. 587-592.

* cited by examiner

*Primary Examiner* — Tom Duong
(74) *Attorney, Agent, or Firm* — Oblon, McClelland, Maier & Neustadt, L.L.P.

(57) ABSTRACT

The present invention relates to an electrocatalytic system for the joint treatment of oxidizing polluting entities of the $NO_x$ type and reducing polluting entities of the hydrocarbons HC or CO type present in a gas to be purified, in particular an exhaust gas resulting from a combustion engine, said system comprising:
  a catalyst A for reduction of the polluting entities of the $NO_x$ type,
  a catalyst B for oxidation of the polluting entities of the hydrocarbons HC type and CO,
  a compound E which conducts electrons and ions by oxide ions,
said catalysts A and B being in contact with the compound E, said compound E being composed of an oxide which conducts ions and electrons corresponding to the molar formulation:

$$Ce_{1-y-z}O_{2-x}M_yN_z$$

in which Ce is cerium, M is an element chosen from: Gd, Y, Sc, Sm, La, Pr, Nd, Er or Tb, y is between 0.01 and 0.4, N is an element having several degrees of valency chosen from: Ti, V, Cr, Mn, Fe, Co, Ni or Cu, z is less than 0.4 and x is greater than 0.05.

15 Claims, No Drawings

ELECTROCHEMICAL CATALYSIS SYSTEM

The present invention relates to the field of the purification of a gas laden with gaseous pollutants essentially of the $NO_x$ and CO/HC type. More particularly, the invention relates to catalytic systems for the treatment of exhaust gases from a diesel or gasoline engine which make it possible to remove said polluting entities by reduction of said entities of the $NO_x$ type and by oxidation of hydrocarbons HC and/or CO.

The techniques and the problems relating to the purification of polluted gases, in particular at the outlet of the exhaust lines of gasoline or diesel motor vehicles, are well known in the art. A conventional three-way catalyst makes possible joint treatment of the pollutants $NO_x$, CO and HC and their conversion into neutral and chemically harmless gases, such as $N_2$, $CO_2$ and $H_2O$. However, very good effectiveness of the system is achieved only by continual adjustment of the richness of the air/fuel mixture. It is thus known that the slightest discrepancy with respect to the stoichiometry of the mixture brings about a large increase in the emissions of the pollutants.

In order to solve this problem, provision has been made to incorporate, in the catalyst, materials which make it possible to temporarily fix the $NO_x$ compounds (often known in the trade as $NO_x$ trap) when the mixture is lean (that is to say, less than stoichiometric with regard to fuel, in other words greater than stoichiometric with regard to oxygen). The major disadvantage of such a system is, however, that the reduction of the $NO_x$ compounds can be carried out only at the expense of an overconsumption of fuel. This is because the desorption of the $NO_x$ compounds trapped on the catalyst and their catalytic reduction to give gaseous nitrogen $N_2$ can only be obtained in the presence, at the reduction catalyst, of a sufficient amount of the reductive entities in the form of hydrocarbons or carbon monoxide CO or a gaseous hydrogen $H_2$, it being possible for the gaseous hydrogen to be itself obtained by catalytic reaction between the hydrocarbons HC and steam or between the CO and steam.

According to a different approach, the U.S. Pat. No. 6,878,354 describes a combination of catalysts for the oxidation of the HC compounds and CO and for the reduction of the $NO_x$ compounds by the electrochemical route. Such systems appear advantageous as they make possible an electrochemical reaction between two catalysts for reduction A and for oxidation B connected to one another both by a conductor of electrons C and a conductor of ions D. According to this publication, such a system makes it possible in particular to increase the catalytic conversion of the polluting entities, in particular for an engine operating as a lean mixture.

In order to be effective, however, such a system requires the use of a substance which adsorbs the $NO_x$ compounds and of a substance which adsorbs the HC hydrocarbons.

According to a first embodiment described in this patent, the catalysts A and B are deposited on a metal support, as a mixture with a conductor of ions D. The metal support provides the electrons necessary for the satisfactory operation of the electrochemical system. However, the use of such a support in an exhaust line of a motor vehicle engine, in particular a diesel engine, is problematic essentially because of its low resistance to oxidation and its mediocre chemical resistance. Furthermore, this type of metal support has the major disadvantage of exhibiting a low chemical and dilatometric compatibility with the catalysts, which in addition have to incorporate, according to the teaching provided in U.S. Pat. No. 6,878,354, $NO_x$ or HC traps of the type: barium oxides, zeolites or other mixed oxides, also of low chemical compatibility with the metal support.

According to a second embodiment described in U.S. Pat. No. 6,878,354, the four constituents A, B, C and D are introduced as a mixture onto a nonconductive ceramic support composed of cordierite.

The efficacy of such a system then depends strongly on the conditions of deposition of the catalysts A and B and on the conductors of electrons C and of ions D. This is because the properties obtained are highly dependent on the dispersing of the various phases corresponding to the various constituents over the support used, a connection being necessary between these four elements for the satisfactory operation of the electrochemical system. Finally, as the electrochemical system is composed of grains, small in size, randomly positioned with respect to one another, its effectiveness is necessarily limited, on the one hand, by the connections between the grains and, on the other hand, by the small amount of the electrolytes (electrons and/or ions) available for the satisfactory operation of the electrochemical catalysis system.

More recently, on the basis of these same principles, a description has been given, in the application WO 2007/116194, filed by the Applicant Company, of a structure for the purification of gases, in particular a particle filter, in which the constituent material of the porous walls of said structure acts as conductor of electrons C and/or as conductor of ions D in the electrocatalytic system described.

Currently, however, no simple catalytic system is known which makes possible substantial conversion of the $NO_x$ compounds to $N_2$ even in an oxidizing atmosphere, that is to say in the presence of an excess of oxygen. One of the aims of the present invention is to overcome such a drawback by making possible in particular the conversion of a substantial amount of the $NO_x$ entities, including at a temperature of less than 500° C., whatever the chemical composition of the gas mixture to be purified, in particular even when the air/fuel ratio of the gas medium to be purified, in particular of the exhaust gases resulting from a combustion engine, is lean.

More particularly, the aim of the present invention is to provide an electrocatalytic system suitable for the purification of a gas laden with gaseous pollutants of the HC and/or CO type and with pollutants of the $NO_x$ type, and their joint and simultaneous conversion into neutral and chemically harmless gases, such as $N_2$, $CO_2$ and $H_2O$, it being possible for said system to operate whatever the atmosphere: oxidizing, neutral or reducing.

Such a catalytic system has, for example, an application in a structure for the filtration of an exhaust gas resulting from a gasoline or diesel engine laden with gaseous pollutants and with solid particles, as it is capable of operating whatever the richness of the air/fuel mixture.

According to a first aspect, the present invention relates to an electrocatalytic system for the joint treatment of oxidizing polluting entities of the $NO_x$ type and reducing polluting entities of the hydrocarbons HC or CO type present in a gas to be purified, in particular an exhaust gas resulting from a combustion engine, said system comprising:

a catalyst A for reduction of the polluting entities of the $NO_x$ type,
  a catalyst B for oxidation of the polluting entities of the hydrocarbons HC type and CO,
  a compound E which conducts electrons and ions by oxide ions, said catalysts A and B being in contact with the compound E, said compound E being composed of an oxide which conducts ions and electrons corresponding to the molar formulation:

$$Ce_{1-y-z}O_{2-x}M_yN_z,$$

in which:
Ce is cerium,
M is an element chosen from: Gd, Y, Sc, Sm, La, Pr, Nd, Er or Tb,
y is between 0.01 and 0.4,
N is an element having several degrees of valency chosen from: Ti, V, Cr, Mn, Fe, Co, Ni or Cu,
z is less than 0.4,
x is greater than 0.05.

The catalyst A used for the reduction reaction is chosen from catalysts well known in the art for their activity and preferably their selectivity with regard to reactions for the reduction of $NO_x$ compounds. They can be chosen in particular from compounds including precious metals impregnated at the surface with a powder of high specific surface, for example alumina. These metals are preferably Rh, Cu or Ni.

The catalyst B used for the reaction of the oxidation of hydrocarbons is chosen from catalysts well known in the art for their activity and preferably their selectivity with regard to reactions for the oxidation of hydrocarbons. In particular, the reforming and steam reforming catalysts used in the petrochemical and refining field can be used according to the invention. These are in particular catalysts based on Pt, Pd, Ag, Fe, Co or Au.

According to preferred but nonlimiting embodiments of the invention:
y is between approximately 0.1 and approximately 0.3 and z=0. In this case, the oxide which conducts ions and electrons corresponds to the formula $Ce_{1-y-z}O_{2-x}M_y$ in which y is between approximately 0.1 and approximately 0.3.

For example, the oxide which conducts ions and electrons corresponds to the formula $Ce_{1-y}O_{2-x}Gd_y$, and y is between approximately 0.1 and approximately 0.3.

z is greater than 0 and preferably between 0.01 and 0.2. In this case, for example, the oxide which conducts ions and electrons corresponds to the formula $Ce_{1-y-z}O_{2-x}Y_y\text{-}Ti_z$, y being between approximately 0.1 and approximately 0.3 and z being between 0.01 and 0.1.

x is between 0.1 and 0.4, preferably between 0.1 and 0.3.

The compound E comprises oxygen holes and a portion of the $Ce^{4+}$ cations of the crystal lattice is converted into $Ce^{3+}$ cations. According to the invention, the proportion of the $Ce^{3+}$ ions is preferably between 25 and 75%, in particular between 40 and 70%.

The term "proportion of the $Ce^{3+}$ cations" is understood to mean the proportion of the trivalent cations as calculated according to the $Ce^{3+}/Ce^{4+}$ ratio. The method for determining such a ratio by magnetic susceptibility measurements is well known and is described, for example, in the publication "*Catalysis Today*, vol. 54, pages 93-100 (1999)".

The oxide which conducts ions and electrons exhibits a specific surface of between 0.5 and 100 $m^2/g$, preferably between 1 and 30 $m^2/g$.

The electronic resistivity of the compound E is less than 20 ohms·cm at 400° C. and the ionic conductivity of the compound E is between 1 and $10^{-4}$ siemens/cm at 400° C.

The invention also relates to a structure for decontaminating and/or filtering a gas laden with gaseous pollutants and optionally with solid particles, composed of a porous inorganic material on which is deposited a catalytic system as described in one of the preceding claims.

The present invention has an application very particularly in the structures used for the purification and/or filtration of an exhaust gas from a diesel engine. Structures of inorganic porous foam type or honeycombs capable of being composed of the inorganic material E or on which, indeed even in the porosity of which, the electrocatalytic system according to the invention can be deposited are appropriate. In particular, structures, generally denoted under the term particle filters, comprise at least one and preferably a plurality of monolithic honeycomb blocks. Unlike the purification devices described above, in such filters, said block or blocks comprise a collection of adjacent conduits or channels with axes parallel to one another separated by porous walls, the open porosity of which is, for example, greater than 30%, sealed by plugs at one or other of their ends in order to delimit inlet conduits which open on a face for admission of gases and outlet conduits which open on a face for discharge of gases, so that the gas passes through the porous walls. Examples of such assembled or nonassembled structures are, for example, described in the publications EP 0 816 065, EP 1 142 619, EP 1 306 358 or EP 1 591 430.

In such filtering structures, the gases are forced to pass through the walls. Studies carried out by the Applicant Company have shown that the use of an electrochemical catalyst system as described above makes possible, surprisingly, on the one hand, very good conversion of the polluting entities without, however, substantially increasing the pressure drop brought about by the introduction of the filter onto the exhaust line.

The following may in particular be indicated among the other advantages:
the introduction of the catalytic system into the porosity of the filtering structure advantageously makes it possible to greatly increase the probability of contact between the polluting entities and the catalytic system,
the catalytic system, which operates continuously on the model of a battery, makes possible the joint conversion of the $NO_x$ oxidizing polluting entities and of the reducing polluting entities, whatever their nature and the atmosphere of the exhaust gases: oxidizing, neutral or reducing, that is to say whatever the initial richness of the air/fuel mixture,
unlike the catalyzed structures described in the publications U.S. Pat. No. 6,878,354 or WO 2007/116194, the constituents of the system can be deposited in the filter in just one impregnation, which greatly reduces the dependence of the performance of the system with respect to the conditions of deposition of the catalyst.

The electrochemical system according to the invention can be employed according to different possible forms, according to any technique known in the art. In particular, according to one possible embodiment, the porous inorganic structure is impregnated with an aqueous solution comprising particles of the mixed conductor and catalysts A and B, so as to form the system according to the invention. According to one possible form, the inorganic material constituting all or a portion of the inorganic structure is chosen from the following list, alone or in combination: metal or sintered metal, cordierite, aluminum titanate, alumina, mullite, silicon nitride or silicon carbide. Structures formed of inorganic material which conducts electrons, such as silicon carbide or metals, make it possible to regenerate the catalytic system by polarization.

Such a system contributes in addition to improving the effectiveness of regeneration of the filter by promoting a greater degree of oxidation of the soot.

A better understanding of the invention and its advantages will be obtained on reading the following nonlimiting examples.

EXAMPLES

Example 1

An oxide with the general composition $Ce_{0.75}Y_{0.2}Ti_{0.05}O_2$ was prepared according to the following method:

A precursor of the oxide which conducts ions and electrons is first prepared by a sol-gel method by mixing the reactants given below in equivalent proportions in order to obtain, in the initial mixture, in moles: 0.2 part of Y, 0.75 part of Ce and 0.05 part of Ti.

The following reactants (salts) were used:
yttrium acetate tetrahydrate: $Y(CH_3COO)_3.4H_2O$ (99-102%, Alfa Aesar),
cerium nitrate hexahydrate $Ce(NO_3)_3.6H_2O$ (99.99%, Alfa Aesar),
titanium isopropoxide $Ti(OC_3H_5)_4$ (99.9%, Alfa Aesar).

According to a first stage, precursor salts are dissolved in ultrapure distilled water. A solution of salts and an organic solution are prepared. The precursor salts, in the proportions desired in order to obtain the compound $Ce_{0.75}Y_{0.2}Ti_{0.05}O_2$ as described above, are dissolved in the ultrapure distilled water at ambient temperature and with stirring.

Water is added until all the salts have dissolved. For the synthesis of 10 g of mixed conductor, approximately 130 ml of ultrapure distilled water are added. At the same time, PEG 2000 (Fluka, $HO-(CH_2-CH_2-O)_n-H$) is dissolved in isopropanol (Acros organics). The isopropanol represents 90% by weight of the organic solution. Dissolution takes place with stirring and at 40° C. The above two solutions are subsequently brought to 55° C. and mixed, so that the solution of salts represents 50% by weight of the final solution. The solution obtained is subsequently placed on a rotary evaporator at 60° C. for 1 h 30 in order to promote homogenization.

The PEG 2000 creates a three-dimensional periodic polymer network in which the salts can be incorporated. The drying and the evaporation of the solvent take place on the rotary evaporator under a pressure of 1100 mbar.

The stage of removal of the organic compounds is carried out by heating at 600° C. for 30 minutes. The ascent gradient is 50° C./h. The above gel is placed in an alumina crucible in order to be certain of removing all the organic residues. The oxide thus recovered, with the composition $Ce_{0.75}Y_{0.2}Ti_{0.05}O_2$, exhibits a yellow color after manual grinding with a mortar. Its specific surface is measured by a conventional surface area analysis according to the BET method. This method for measuring specific surface by adsorption of inert gas was developed by S. Brunauer, P. H. Emmett and J. Teller and is well known to the person skilled in the art. The specific surface of the product thus obtained is approximately 57 m²/g.

The powder thus obtained is impregnated with a platinum precursor in the form of platinum diammine dinitrite $(NH_3)_2Pt(NO_2)_2$ (Alfa Aesar, 1.7% by weight of Pt), then poured into a round-bottomed flask and mixed with a solution of platinum precursor and of ultrapure water. The round-bottomed flask is immersed in a waterbath and heated at a temperature of 70° C. with stirring for 70 minutes. After stirring, the round-bottomed flask is removed from the waterbath and is then cooled to ambient temperature. The round-bottomed flask is subsequently reimmersed and gently heated, under low vacuum, up to 60° C. Once the solvent has been completely evaporated after approximately 2 hours at 60° C., the powder is dried in an oven at 110° C. for 3 hours and then ground. The catalyst thus obtained is subsequently calcined under air at 500° C. for one hour. Rhodium is subsequently impregnated on the oxide $Ce_{0.75}Y_{0.2}Ti_{0.05}O_2$ from a nitrate solution (solution of rhodium nitrate $Rh(NO_3)_3$, Alfa Aesar, 10% by weight of Rh metal) on the basis of a protocol identical to that described above for the deposition of platinum.

After the impregnation, the oxide, with a general formulation $Ce_{0.75}Y_{0.2}Ti_{0.05}O_2$, exhibits contents by weight of approximately 0.3% for Pt and Rh, with respect to the weight of the system $Pt/Ce_{0.75}Y_{0.2}Ti_{0.05}O_2/Rh$.

The oxide comprising the two catalysts is subsequently treated in order to obtain the electrochemical system according to the invention, that is to say reduced under conditions which make it possible to obtain a state highly deficient in oxygen ions of the crystal lattice of the oxide. More specifically, the oxide is subjected to reduction under pure $H_2$ (>99.99% by weight) at temperatures exceeding or close to 600° C. and for a period of time sufficient to obtain a state highly deficient in oxygen, that is to say an oxide with the general formulation $Ce_{0.75}Y_{0.2}Ti_{0.05}O_{1.7}$ (x=0.3).

The degree of oxygen deficiency x of the oxide (or oxygen substoichiometry) was evaluated according to the invention according to conventional techniques by temperature-programmed reduction (TPR). The samples are heated up to 900° C. under an atmosphere comprising $H_2$ ($H_2$/He mixture with one mol % of $H_2$, 1.8 l/h, 10° C./minute).

According to well known techniques, the hydrogen consumption is directly correlated with the parameter x. More specifically, the value of x is obtained on the basis of the hydrogen consumed by the oxide tested with reference to an oxide which is not deficient in oxygen (for which x=0). The value of x of the deficient oxide is obtained directly by dividing the number of moles of hydrogen gas consumed by the number of moles of the deficient oxide tested.

The stage of reduction at high temperature under the hydrogen atmosphere according to the invention makes it possible to remove a portion of the oxygens not only at the surface but also throughout the volume of the oxide, with the creation of oxygen holes throughout the crystal lattice. At the same time, without this being able to be regarded as a definitive and limiting affirmation, such a stage of creation of oxygen holes might be accompanied by partial conversion of a portion of the $Ce^{4+}$ cations of the lattice to $Ce^{3+}$ cations.

A complex and autonomous electrochemical system is thus obtained which operates on the model of a battery and is composed of two catalysts:
  a catalyst A (Rh) for reduction of the polluting entities of the $NO_x$ type,
  a catalyst B (Pt) for the oxidation of hydrocarbons HC and of CO,
the two catalysts being in contact with the oxide which conducts ions and electrons.

Comparative Example 1

According to this comparative example 1, example 1 was reproduced in an identical way except that the final stage of removal of a portion of the oxygens from the crystal lattice of the oxide was not carried out. Thus, in the end, according to this example, an oxide with the general formulation $Ce_{0.75}Y_{0.2}Ti_{0.05}O_2$ is obtained, this time without oxygen holes, exhibiting contents by weight of approximately 0.3% for Pt and Rh.

Example 2

According to this second example, a compound according to the invention comprising cerium and gadolinium was synthesized.

In a first step, commercial powder with the stoichiometric molar general formulation $Ce_{0.8}Gd_{0.2}O_2$, supplied by NexTech, was characterized. This powder exhibits a specific surface of 32 m²/g.

The stoichiometric oxide is first impregnated with the two catalysts based on Pt and on Rh, according to the same protocol as described above in connection with example 1. Thus, at the end, according to this example, an oxide with the general formulation $Ce_{0.8}Gd_{0.2}O_2$, which does not have oxygen holes, is obtained which exhibits contents by weight of approximately 0.3% for Pt and Rh.

The oxide is subsequently subjected to a treatment under a hydrogen atmosphere and at high temperature for a period of time sufficient to obtain an oxide this time highly deficient in oxygen. It was possible, by the conventional temperature-programmed reduction techniques described above, to show that the substoichiometric oxide corresponds substantially to the following general formula: $Ce_{0.8}Gd_{0.2}O_{1.7}$ (x=0.3).

Comparative Example 2

According to this comparative example 2, example 2 was reproduced in an identical manner except that the final stage of removal of a portion of the oxygens from the crystal lattice of the oxide was not carried out. Thus, in the end, according to this example, an oxide with the general formulation $Ce_{0.8}Gd_{0.2}O_2$ is obtained, this time without oxygen holes, exhibiting contents by weight of approximately 0.3% for Pt and Rh.

Test of Conversion of the $NO_x$ Compounds

The samples of the preceding examples according to the invention and comparative examples, finely ground in the form of a powder, are placed in a U-shaped quartz fixed bed reactor. More specifically, approximately 500 mg of the catalytic system are introduced into the reactor, equipped with a porous sintered quartz component which supports the powder. The volume of the catalyst is of the order of 0.3-0.4 cm³. The catalyst is heated under a stream of He (5 l/h) at 250° C. and at atmospheric pressure. Once the temperature of 250° C. has stabilized, a reaction mixture composed of an $NO_2$/He mixture is introduced over the catalyst according to a total flow rate of 10 l/h and an hourly space velocity of between 25 000 and 35 000 h⁻¹. The gas mixture to be decontaminated initially comprises 500 ppm of $NO_2$. It is representative of a highly oxidizing atmosphere, in the sense, for example, of an exhaust gas resulting from a diesel engine operating with a lean mixture or of a gas resulting from a burner of a glass-making furnace.

An inline analysis of the gases is provided by an infrared analyzer for NO and $N_2O$, by an ultraviolet analyzer for $NO_2$ and by a microchromatograph, equipped with two analytical modules and two catharometric detectors, for oxygen and nitrogen. The change in the concentrations of NO, $NO_2$ and $N_2$ and $N_2O$ in the gases to be treated is monitored as a function of time from the introduction of the $NO_2$/He mixture over the catalyst for approximately 2 hours (6500 seconds). An overall molar percentage of conversion of the $NO_x$ compounds to $N_2$ by the catalytic system over this entire period is then calculated, as given in tables 1 and 2.

The selectivity of the catalyst for $N_2$, that is to say its ability to exclusively convert the $NO_x$ compounds to $N_2$, is also confirmed at the outlet of the device. The results obtained are set out in the following tables 1 and 2:

TABLE 1

| Sample | Conversion of the $NO_x$ compounds to $N_2$ after 6500 seconds (%) | Total amount of $N_2$ produced (by μmol · g⁻¹ of catalyst) | Selectivity for $N_2$ (%) |
| --- | --- | --- | --- |
| Comp. example 2: Pt/$Ce_{0.8}Gd_{0.2}O_2$/Rh x = 0 | 0 | 0 | 0 |
| Example 2: Pt/$Ce_{0.8}Gd_{0.2}O_{1.7}$/Rh x = 0.3 | 55 | 412 | 100 |

TABLE 2

| Sample | Conversion of the $NO_x$ compounds to $N_2$ after 6500 seconds (%) | Total amount of $N_2$ produced (μmol · g⁻¹ of catalyst) | Selectivity for $N_2$ (%) |
| --- | --- | --- | --- |
| Comp. example 1: Pt/$Ce_{0.75}Y_{0.2}Ti_{0.05}O_2$/Rh x = 0 | 0 | 0 | 0 |
| Example 1: Pt/$Ce_{0.75}Y_{0.2}Ti_{0.05}O_{1.7}$/Rh x = 0.3 | 70 | 512 | 100 |

The results obtained, in particular those given in the above tables 1 and 2, show that the catalytic systems according to the invention (examples 1 and 2) have the ability to be able to reduce $NO_2$ to nitrogen even in a highly oxidizing medium. Under the same conditions, the samples of comparative examples 1 and 2, which are not deficient in oxygen, do not succeed in carrying out this reduction.

The degree of conversion of $NO_2$ to $N_2$ is 412 μmol/g with the Pt/$Ce_{0.8}Gd_{0.2}O_{1.9}$/Rh system and is increased to 512 μmol/g with the use of a Pt/$Ce_{0.75}Y_{0.2}Ti_{0.05}O_{1.7}$/Rh system. The activity for conversion of the $NO_x$ compounds to $N_2$ thus appears to be even greater for a mixed conductive oxide additionally incorporating an element N having several degrees of valency (of oxidation) within the meaning described above.

The selectivity of the systems according to the invention is very high. The term "selective" is understood to mean that more than 80 mol %, indeed even more than 90 mol %, of the $NO_x$ compounds converted are converted into $N_2$. The selectivity was determined by measuring the percentage of $N_2$ produced (in μmol) with respect to the amount of the $NO_x$ compounds converted ($N_2$+$N_2O$) by the catalytic system over the duration of the test (6500 seconds). In this case, the systems according to the invention do not show the presence of $NO_x$ compounds converted to $N_2O$ as the selectivity is 100%.

In addition, according to a property not yet described to date, significant conversion of the pollutants is observed at a low temperature, that is to say from 250° C., whereas standard catalysts are active at much higher temperatures. For example, current three-way catalysts, in particular zeolites, are mainly active between 700 and 1000° C.

Measurement of the Proportion of $Ce^{3+}$ Ions

The proportion of the cations is measured by the $Ce^{3+}$/$Ce^{4+}$ ratio, obtained by means of magnetic susceptibility measurements (also known as magnetic balance measurements), in a way well known in the field. For the examples according to the invention, the proportion of $Ce^{3+}$ ions is of the order of 40 to 600.

Measurement of the Ionic and Electronic Conductivities

The conductivities can be measured by conventional impedance techniques, for example as described in the publication "*Acta Materialia*, vol. 56, pages 4658-4672 (2008)". The ionic and electronic conductivities of the samples according to examples 1 and 2 according to the invention are far below those of the comparative examples and are the only ones to be in accordance with the subject matter of the present invention: electronic resistivity of less than 20 ohms·cm at 400° C. and ionic conductivity of between 1 and $10^{-4}$ siemens/cm at 400° C.

The catalytic system according to the invention thus has a use very particularly in the decontamination of a gas this time laden both with HC and CO entities and with $NO_x$ compounds, in particular the decontamination of a motor vehicle exhaust gas. On the one hand, as demonstrated above, the catalytic system proves to be capable of operating whatever the operation of the engine, rich fuel mixture and lean fuel mixture. In addition, according to the scheme already described in the patent application WO 2007/116194, in such an application, the electrons released on the one hand by the conversion of the HC and CO entities at the catalyst B are conveyed by the conductor oxide to the site of the catalyst A and make possible the joint reduction of the polluting entities of the $NO_x$ type. Likewise, the oxygen ions released by the reduction reaction are freely transported via the oxygen-hole lattice of the oxide to the sites of the catalytic reaction for oxidation of the HC compounds and CO. A decontamination system independent of the general atmosphere, oxidizing, reducing or neutral, of the gases to be treated is thus obtained. Such a system makes it possible in particular to treat the $NO_x$ entities present in an oxidizing atmosphere typically resulting from an air/fuel lean mixture feeding an internal combustion engine or resulting from a glassmaking furnace. In addition, the electrochemical system according to the invention does not require any prior trapping of the $NO_x$ compounds.

According to the invention, successive cycles incorporating phases of feeding the filter with rich mixture (reducing medium) might remain useful, in particular in a use as particle filter, especially for maintaining a value of x of greater than 0.05, making possible the continuous and more efficient conversion of the $NO_x$ compounds. However, the frequency of a cycle for a catalytic system according to the invention is of the order of an hour, indeed even of several hours, whereas this frequency, for the achievement of an equivalent conversion of the $NO_x$ compounds according to the catalytic systems of the prior art incorporating $NO_x$ traps, is of the order of only a few minutes.

What is claimed is:

1. An electrocatalytic system comprising:
   a first catalyst (A) configured to reduce $NO_x$ polluting entities present in a gas to be purified;
   a second catalyst (B) configured to oxidize hydrocarbons (HC) polluting entities and CO present in the gas; and
   a compound (E), which conducts electrons and ions by oxide ions,
   wherein catalysts (A) and (B) are in contact with the compound (E),
   wherein the compound (E) comprises an oxide which conducts ions and electrons, the compound E having formula (I):

$$Ce_{1-y-z}O_{2-x}M_yN_z \qquad (I),$$

wherein:
   Ce is cerium;
   M is Gd, Y, Sc, Sm, La, Pr, Nd, Er, or Tb;
   y is from 0.01 to 0.4;
   N is Ti, V, Cr, Mn, Fe, Co, Ni, or Cu;
   z is less than 0.4; and
   x is greater than 0.05.

2. The electrocatalytic system of claim 1, wherein, in formula (I), y is from 0.1 to 0.3 and z=0.

3. The electrocatalytic system of claim 1, wherein the oxide which conducts ions and electrons has formula $Ce_{1-y}O_{2-x}Gd_y$.

4. The electrocatalytic system of claim 1, wherein, in formula (I), z is greater than 0.

5. The electrocatalytic system of claim 4, wherein the oxide which conducts ions and electrons has formula $Ce_{1-y-z}O_{2-x}Y_yTi_z$, wherein y is from 0.1 to 0.3 and z is from 0.01 to 0.1.

6. The electrocatalytic system of claim 1, wherein the compound E comprises oxygen holes and wherein a portion of $Ce^{4+}$ cations of the crystal lattice is converted into $Ce^{3+}$ cations.

7. The electrocatalytic system of claim 6, wherein the proportion of $Ce^{3+}$ ions, as given by the $Ce^{3+}/Ce^{4+}$ ratio, is between 25 and 75%.

8. The electrocatalytic system of claim 1, wherein, in formula (I), x is from 0.1 to 0.4.

9. The electrocatalytic system of claim 1, wherein the oxide which conducts ions and electrons exhibits a specific surface of from 0.5 to 100 $m^2/g$.

10. A structure configured to decontaminate and/or filter a gas comprising gaseous pollutants and optionally comprising solid particles, the structure comprising a porous inorganic material comprising a coating comprising the catalytic system of claim 1.

11. The structure of claim 10, comprising a monolithic honeycomb block comprising a collection of adjacent channels with axes parallel to one another separated by walls, the open porosity of which is greater than 30%, wherein the channels are sealed by plugs at one or other of their ends in order to delimit inlet conduits which open on a face for admission of gases and outlet conduits which open on a face for discharge of gases, such that the gas passes through the porous walls, in which the catalytic system is deposited.

12. The electrocatalytic system of claim 1, wherein the electronic resistivity of the compound E is less than 20 ohms·cm at 400° C., and the compound E has an ionic conductivity from 1 to $10^{-4}$ siemens/cm at 400° C.

13. The electrocatalytic system of claim 1, wherein, in formula (I), z is from 0.01 to 0.2.

14. The electrocatalytic system of claim 1, wherein, in formula (I), x is from 0.1 to 0.3.

15. The electrocatalytic system of claim 1, wherein the oxide which conducts ions and electrons exhibits a specific surface of from 1 to 30 $m^2/g$.

* * * * *